(12) United States Patent
Bushman

(10) Patent No.: US 9,152,507 B1
(45) Date of Patent: Oct. 6, 2015

(54) PRUNING UNWANTED FILE CONTENT FROM AN IMAGE BACKUP

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/477,984

(22) Filed: Sep. 5, 2014

(51) Int. Cl.
*G06F 17/00* (2006.01)
*G06F 7/00* (2006.01)
*G06F 11/14* (2006.01)
*G06F 17/30* (2006.01)

(52) U.S. Cl.
CPC ........ *G06F 11/1469* (2013.01); *G06F 17/3028* (2013.01); *G06F 17/30082* (2013.01)

(58) Field of Classification Search
CPC ............ G06F 11/1448; G06F 11/1461; G06F 11/1458; G06F 21/568; G06F 2221/0782
USPC .......................................................... 707/654
See application file for complete search history.

(56) References Cited

U.S. PATENT DOCUMENTS

| | | | | |
|---|---|---|---|---|
| 5,907,672 | A * | 5/1999 | Matze et al. | 714/6.13 |
| 6,546,404 | B1 * | 4/2003 | Davis et al. | 1/1 |
| 6,785,786 | B1 * | 8/2004 | Gold et al. | 711/162 |
| 7,266,655 | B1 * | 9/2007 | Escabi et al. | 711/162 |
| 7,415,585 | B1 * | 8/2008 | Rossi | 711/162 |
| 7,620,765 | B1 * | 11/2009 | Ohr et al. | 711/4 |
| 7,756,833 | B2 * | 7/2010 | Van Ingen et al. | 707/640 |
| 8,244,681 | B2 * | 8/2012 | Laffin | 707/644 |
| 8,364,644 | B1 * | 1/2013 | Yadav et al. | 707/649 |
| 8,751,454 | B1 * | 6/2014 | Bushman et al. | 707/640 |
| 2003/0028736 | A1 * | 2/2003 | Berkowitz et al. | 711/162 |
| 2003/0145248 | A1 * | 7/2003 | McNeil | 714/13 |
| 2006/0075294 | A1 * | 4/2006 | Ma et al. | 714/13 |
| 2006/0149916 | A1 * | 7/2006 | Nase | 711/173 |
| 2007/0174316 | A1 * | 7/2007 | Grubbs et al. | 707/101 |
| 2007/0261059 | A1 * | 11/2007 | Orth et al. | 719/312 |
| 2008/0140963 | A1 * | 6/2008 | Thomason et al. | 711/162 |
| 2009/0307286 | A1 * | 12/2009 | Laffin | 707/204 |
| 2011/0161299 | A1 * | 6/2011 | Prahlad et al. | 707/649 |
| 2011/0289584 | A1 * | 11/2011 | Palagummi | 726/24 |

* cited by examiner

*Primary Examiner* — Pavan Mamillapalli
(74) *Attorney, Agent, or Firm* — Maschoff Brennan

(57) ABSTRACT

Pruning unwanted file content from an image backup. In one example embodiment, a method of pruning unwanted file content from an image backup includes identifying files to be excluded from a base image backup of a source storage, identifying a set of all allocated blocks in the source storage at a first point in time by accessing a file system block allocation map (FSBAM), pruning the set of all allocated blocks to exclude the allocated blocks that correspond to content of the files to be excluded, backing up the pruned set of allocated blocks, and not backing up the excluded allocated blocks, in the base image backup, and restoring the base image backup to a restore storage, the restoring including pruning FSM of a file system of the restore storage to modify metadata associated with the files to be excluded prior to exposing the file system to any user.

20 Claims, 10 Drawing Sheets

PRUNING UNWANTED FILE CONTENT FROM AN IMAGE BACKUP

FIELD

The embodiments disclosed herein relate to pruning unwanted file content from an image backup.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of blocks that are allocated to each file that is stored in the storage as well as the locations of allocated blocks which are used by the file system for its own internal on-storage structures. The file system may also track free blocks that are neither allocated to any file nor allocated to any file system on-storage structure. The file system generally tracks allocated and/or free blocks using a specialized on-storage structure stored in the file system metadata (FSM), referred to herein as a file system block allocation map (FSBAM).

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system on-storage structures such as the FSM. Also, because image backup backs up all allocated blocks rather than individual files, this approach does not generally need to be aware of the file system on-storage data structures or the files stored in the source storage, beyond utilizing the FSBAM in order to only back up allocated blocks since free blocks are not generally backed up.

An image backup can be relatively fast compared to file backup because reliance on the file system is minimized. Further, the use of snapshot technology during an image backup may enable an image backup to capture the data stored in a source storage at a particular point in time without interrupting other processes, thus avoiding downtime of the source storage.

One common problem encountered when backing up a source storage using image backup or managing image backups is the potential for the inclusion of unwanted files in the backups. For example, a very large digital movie file may initially be stored in a source storage. At the time of a backup of the source storage, or at a subsequent time of a collapse of backups into a synthetic backup that includes the movie file, a user may wish to delete the movie file in order to save space in the backup(s) of the source storage. However, image backup and collapse methods do not generally allow individual files to be deleted from a backup, and the content of the unwanted file must therefore be needlessly retained in the backup. Retaining unwanted file content in a backup may increase the overall size requirements of a backup storage where the backup is stored, increase the bandwidth overhead of transporting the backup, increase the processing time associated with collapsing the backup into a synthetic backup, and increase the processing time associated with restoring the backup.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to pruning unwanted file content from an image backup. The example methods disclosed herein may be employed to prune blocks that correspond to content of one or more unwanted files during the creation of a backup or of a synthetic backup. The pruning of the example methods disclosed herein may decrease the overall size requirements of a backup storage where a backup is stored, decrease the bandwidth overhead of transporting the backup, decrease the processing time associated with collapsing the backup into a synthetic backup, and/or decrease the processing time associated with restoring the backup.

In one example embodiment, a method of pruning unwanted file content from an image backup includes identifying files to be excluded from a base image backup of a source storage, identifying a set of all allocated blocks in the source storage at a first point in time by accessing a file system block allocation map (FSBAM) of file system metadata (FSM) of a file system of the source storage, pruning the set of all allocated blocks to exclude the allocated blocks that correspond to content of the files to be excluded, backing up the pruned set of allocated blocks, and not backing up the excluded allocated blocks, in the base image backup, and restoring the base image backup to a restore storage, the restoring including pruning FSM of a file system of the restore storage to modify metadata associated with the files to be excluded prior to exposing the file system to any user such that the files to be excluded are no longer listed as existing within the FSM of the file system of the restore storage. In this example embodiment, the FSBAM indicates, as being allocated, block positions that are allocated in the source storage.

In another example embodiment, a method of pruning unwanted file content from an image backup includes identifying multiple sequential image backups of a source storage to be included in a synthetic image backup of the source storage, identifying files to be excluded from the synthetic image backup, accessing a file system block allocation map (FSBAM) of a most recent of the multiple sequential image backups, identifying a set of allocated blocks that includes a most recent allocated block for each unique block position indicated as allocated within the FSBAM, pruning the set of allocated blocks to exclude the allocated blocks that correspond to content of the files to be excluded, and storing the pruned set of allocated blocks, and not storing the excluded allocated blocks, in the synthetic image backup. In this example embodiment, the FSBAM indicates, as being allocated, block positions that were allocated in the source storage at a creation time of the most recent image backup.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
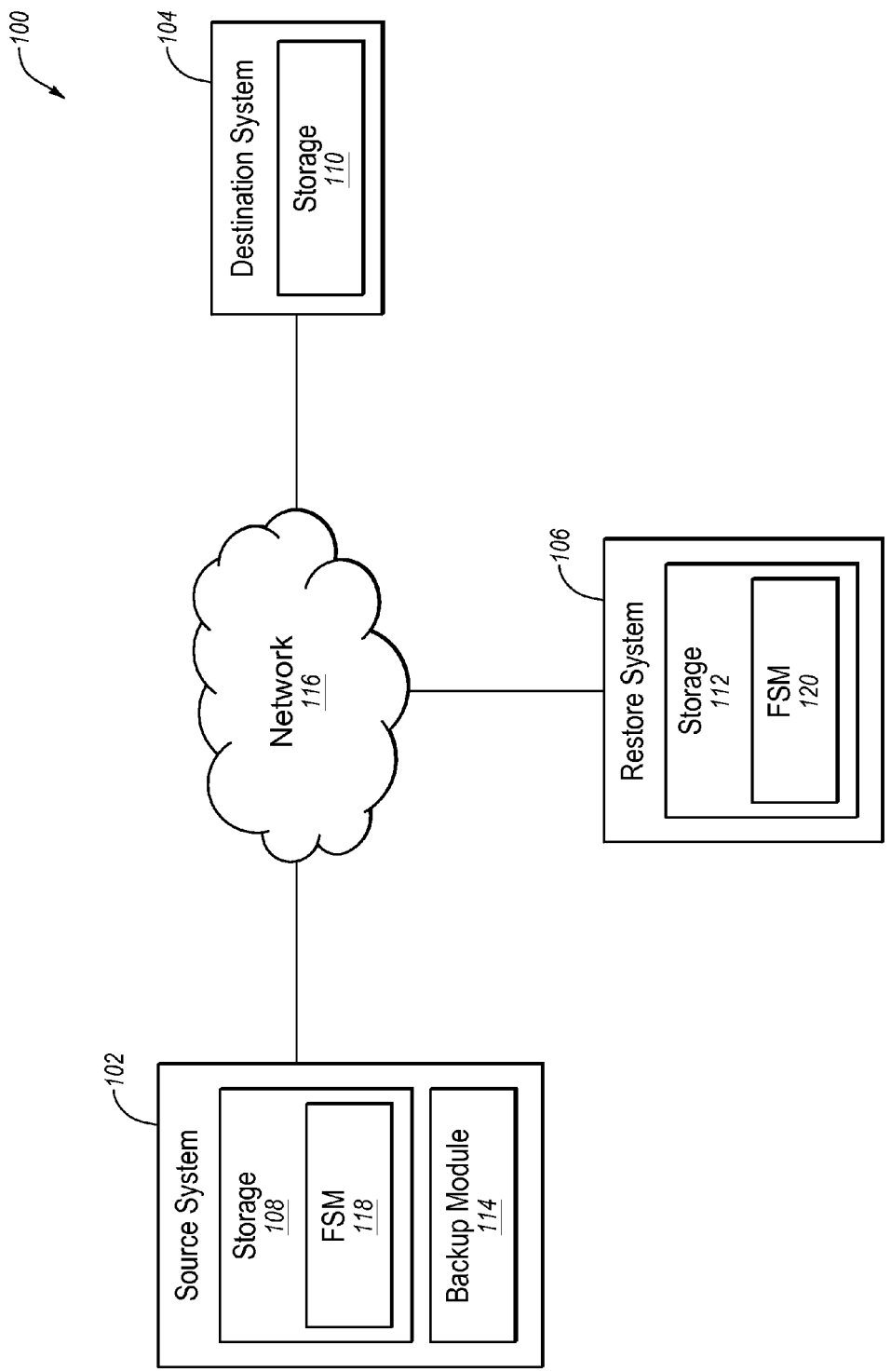
FIG. 1 is a schematic block diagram illustrating an example backup system.

The term "storage" as used herein refers to computer-readable media, or some logical portion thereof such as a volume, capable of storing data in blocks. The term "block" as used herein refers to a fixed-length discrete sequence of bits. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "base backup" as used herein refers to a base backup of a storage that includes at least a copy of each unique allocated block of the storage at a point in time such that the base backup can be restored to recreate the state of the storage at the point in time. A "base backup" may also include nonunique allocated blocks and free blocks of the storage at the point in time. The term "incremental backup" as used herein refers to an at least partial backup of a storage that includes at least a copy of each unique allocated block of the storage that changed between a previous point in time of a previous backup of the storage and the subsequent point in time of the incremental backup, either because the block was previously-allocated and changed or because the block was newly-allocated, such that the incremental backup, along with all previous backups of the storage including an initial base backup of the storage, can be restored together to recreate the exact state of the storage at the subsequent point in time. An "incremental backup" may also include nonunique allocated blocks and free blocks of the storage that changed between the previous point in time and the subsequent point in time. Only "unique allocated blocks" may be included in a "base backup" or an "incremental backup" where only a single copy of multiple duplicate allocated blocks (i.e., nonunique allocated blocks) is backed up to reduce the size of the backup. A "base backup" or an "incremental backup" may exclude certain undesired allocated blocks such as blocks of data belonging to files whose contents are not necessary for restoration purposes, such as virtual memory pagination files and machine hibernation state files. The term "synthetic backup" as used herein refers to a backup that is created by combining copies of blocks from a combination of multiple sequential backups of a storage into a single backup. The term "file system metadata" or "FSM" as used herein refers to metadata maintained by a file system of a storage that tracks, at any given point in time, which blocks of the storage are assigned to each file of the storage and also maintains a file system block allocation map for the storage. The term "file system block allocation map" or "FSBAM" as used herein refers to a map maintained as part of the FSM of a storage that tracks, at any given point in time, which blocks of the storage are allocated and/or which blocks of the storage are free. The term "file exclusion policy" or "FEP" as used herein refers to a policy that defines which files of a storage should be excluded from a backup. The term "file inclusion policy" as used herein refers to a policy that defines which files of a storage should be included in a backup.

FIG. 1 is a schematic block diagram illustrating an example backup system 100. As disclosed in FIG. 1, the example backup system 100 includes a source system 102, a destination system 104, and a restore system 106. The systems 102, 104, and 106 include storages 108, 110, and 112, respectively. The destination storage 110 may store various backups of the source storage 108, including base backups, incremental backups, synthetic base backups, and synthetic incremental backups, as disclosed in greater detail in FIG. 2. The source system 102 also includes a backup module 114. The systems 102, 104, and 106 are able to communicate with one another over a network 116.

Each of the systems 102, 104, and 106 may be any computing device capable of supporting a storage, including a virtual storage such as a virtual volume, and communicating with other systems including, for example, a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, a virtual machine, or some combination thereof. The network 116 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The backups stored in the destination storage 110 may be created by the backup module 114. For example, the backup module 114 may be configured to execute computer instructions to perform image backup operations of creating backups, as discussed in connection with FIG. 2. It is noted that these image backups may initially be created on the source system 102 and then copied to the destination system 104.

During performance of the example methods disclosed herein, the backup module 114 may create a backup of the source storage 108 or may create a synthetic backup by collapsing multiple sequential backups, such as two or more of the backups of the source storage 108 that are stored in the destination storage 110. During the creation of either type of backup, the backup module 114 may prune blocks that correspond to content of one or more unwanted files, which may involve utilizing metadata from file system metadata (FSM) 118 of the source storage 108. Later, during the restore of such a backup, the backup module 114 may prune corresponding metadata from FSM 120 of the restore storage 112. As discussed in greater detail below, pruning the blocks that correspond to content of one or more unwanted files during the creation of the backup or synthetic backup may decrease the overall size requirements of the destination storage 110 where the backup is stored, decrease the bandwidth overhead of transporting the backup over the network 116, decrease the processing time associated with collapsing the backup into a synthetic backup, and/or decrease the processing time associated with restoring the backup on the restore storage 112.

In one example embodiment, the source system 102 may be a desktop computer, the destination system 104 may be a file server, the restore system 106 may be a virtual machine, and the network 116 may include the internet. In this example embodiment, the file server may be configured to periodically back up the storage of the desktop computer over the internet. The file server may also be configured to periodically collapse multiple sequential backups into a synthetic backup. The file server may also be configured to restore any one of the backups to the storage of the virtual machine over the internet if the desktop computer experiences corruption or a user simply desires to restore the storage of the desktop computer to an earlier point in time.

Although only a single storage is disclosed in each of the systems 102, 104, and 106 in FIG. 1, it is understood that any of the systems 102, 104, and 106 may instead include two or more storages, such as two or more volumes. Further, although the systems 102, 104, and 106 are disclosed in FIG. 1 as communicating over the network 116, it is understood that the systems 102, 104, and 106 may instead communicate directly with each other. For example, in some embodiments the systems 102, 104, and 106 may be combined into a single system. Also, although the storages 108, 110, and 112 are disclosed as separate storages, it is understood that the storages 108, 110, and 112 may be combined into a single storage or divided into additional storages. For example, in some embodiments a first volume of the source storage 108 may function as a source storage during the creation of a backup and then the backup may be stored in a second volume of the source storage 108. Subsequently, the backup stored in the second volume may be restored to the first volume, which may enable the first volume of the source storage 108 to be restored to a state of an earlier point in time. In this example, the same first storage functions as both the "source" storage as well as the "restore" storage. Further, although the backup module 114 is the only module disclosed in the example backup system 100 of FIG. 1, it is understood that the functionality of the backup module 114 may be replaced or augmented by one or more similar modules residing on any of the systems 102, 104, or 106 or another system. Finally, although only a single source storage is disclosed in the example backup system 100 of FIG. 1, it is understood that the destination system 104 of FIG. 1 may be configured to simultaneously store backups from multiple source storages.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
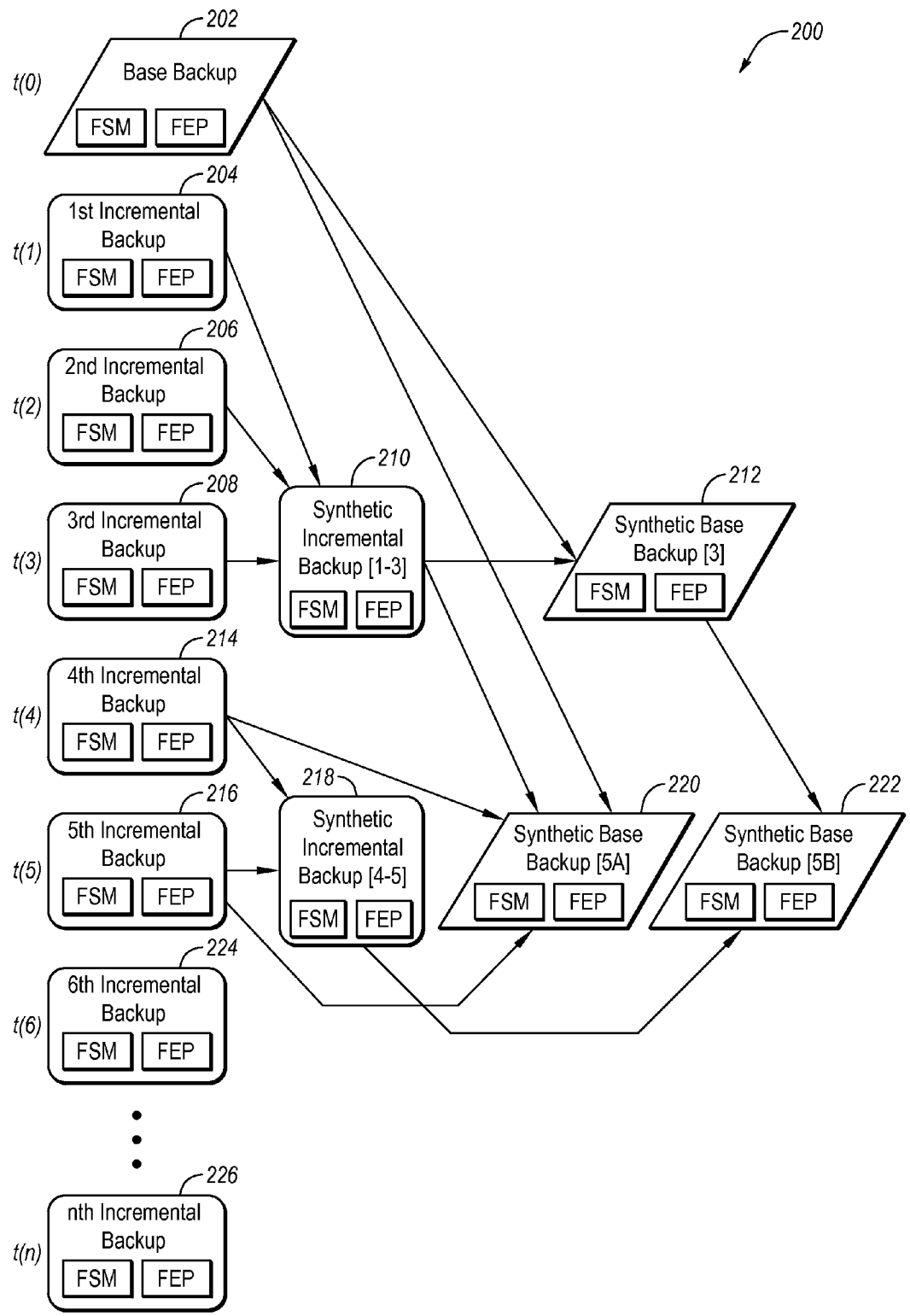
FIG. 2 is a schematic flowchart illustrating an example method for creating a base backup, multiple incremental backups, multiple synthetic base backups, and multiple synthetic incremental backups of a source storage.

FIG. 2 is a schematic flowchart illustrating an example method 200 for creating a base backup, multiple incremental backups, multiple synthetic base backups, and multiple synthetic incremental backups of the source storage 108 of the source system 102 of FIG. 1. The method 200 may be implemented, in at least some embodiments, by the backup module 114 of the source system 102 of FIG. 1. For example, the backup module 114 may be configured to execute computer instructions to perform operations of creating a base backup, multiple incremental backups, multiple synthetic base backups, and multiple synthetic incremental backups of the source storage 108 and then storing these backups in the destination storage 110, as represented by the method 200. The method 200 will now be discussed with reference to FIGS. 1 and 2.

The method 200 may begin at step 202, in which the backup module 114 creates a base backup to capture the state of the source storage 108 at time t(0). The base backup may include all allocated blocks of the source storage 108 as allocated at time t(0). During the creation of base backup and each of the incremental backups in the method 200, an FSBAM of the FSM 118 of the source storage 108 may be accessed at the time of the backup to determine which of the blocks of the source storage 108 are allocated at the time of the backup. A copy of the FSM 118 may also be stored with each of the backups to capture the state of the FSM at the time of the backup. This copy may either be stored by virtue of the backup inherently including the FSM in its backed-up blocks, or the copy may be stored separately, or both. The base backup may be very large depending on the size of the source storage 108 and the number of allocated blocks at time t(0). As a result, the base backup may take a relatively long time to create and consume a relatively large amount of space in the destination storage 110.

At step 204, the backup module 114 creates a 1st incremental backup to capture the state of the source storage 108 at time t(1). The 1st incremental backup may include all allocated blocks of the source storage 108 that changed between time t(0) and time t(1). In general, as compared to the base backup, the 1st incremental backup may take a relatively short time to create and consume a relatively small amount of storage space in the destination storage 110.

At steps 206 and 208, the backup module 114 creates 2nd and 3rd incremental backups to capture the states of the source storage 108 at times t(2) and t(3), respectively. The 2nd incremental backup may include all allocated blocks of the source storage 108 that changed between time t(1) and time t(2). Similarly, the 3rd incremental backup may include all allocated blocks of the source storage 108 that changed between time t(2) and time t(3).

At step 210, the backup module 114 creates synthetic incremental backup [1-3]. The label "[1-3]" indicates that the synthetic incremental backup [1-3] includes data from the 1st through 3rd incremental backups.

At step 212, the backup module 114 collapses the synthetic incremental backup [1-3] into the base backup to create the synthetic base backup [3]. The label "[3]" indicates that the synthetic base backup [3] includes the data from the base backup through the 3rd incremental backup.

At steps 214 and 216, the backup module 114 creates 4th and 5th incremental backups at times t(4) and t(5), respectively. At step 218, the backup module 114 creates a synthetic incremental backup [4-5], which is a combination of the 4th and 5th incremental backups.

At step 220, the backup module 114 creates the synthetic base backup [5A] by collapsing the base backup, the synthetic incremental backup [1-3], and the 4th and 5th incremental backups. Alternatively, at step 222 the backup module 114 creates the synthetic base backup [5B] by collapsing the synthetic base backup [3] and the synthetic incremental backup [4-5]. It is noted that the synthetic base backup [5A] and the synthetic base backup [5B] are identical even though they were created by combining different backups, as each includes data from the base backup through the 5th incremental backup.

At step 224, the backup module 114 creates a 6th incremental backup at time t(6). Then the backup module 114 creates various additional incremental backups, finishing at step 226 with the creation of an nth incremental backup at time t(n).

It is noted that the data from the source storage 108 can be restored to the state at the point in time of a particular backup by applying the image backup file(s) to the restore storage 112 from oldest to newest, namely, first applying the base backup and then applying any successive incremental backup(s).

In general, the creation of synthetic backups may be useful in order to collapse multiple backups of a source storage created at different points in time into a single backup. Since restoring a fewer number of backups stored in a backup storage is generally faster than restoring a greater number of backups, the creations of synthetic backups, and the resulting decrease in the number of backups, may result in faster restore of the backups should the need arise for a restoration of the source storage. Also, once a backup has been collapsed with other sequential backups into a synthetic backup, the original backups may be deleted from the backup storage, thereby decreasing the overall size requirements of the destination storage 110 where the synthetic backup is stored.

In addition to the general usefulness of backups and synthetic backups noted above, the creation of backups and synthetic backups during the method 200 may include pruning of unwanted file content, which may involve the FSMs and file exclusion policies (FEPs) that are associated with each of the backups created at steps 202-226. This pruning of unwanted file content may decrease the overall size requirements of the destination storage 110 where the backups and synthetic backups are stored, decrease the bandwidth overhead of transporting the backups and synthetic backups over the network 116, decrease the processing time associated with collapsing any of the backups into a synthetic backup, and/or decrease the processing time associated with restoring any of the backups and synthetic backups on the restore storage 112, as discussed in greater detail below in connection with FIGS. 3A-6B.

Although only allocated blocks are included in the example base and incremental backups discussed above, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only base backups and incremental backup files are discussed above, it is understood that the source storage 108 may instead be backed up by creating a base backup and one or more decremental image backup files. Decremental backups are created by initially creating a base backup to capture the state at an initial point in time, then updating the base backup to capture the state at a subsequent point in time by modifying only those blocks in the base backup that changed between the initial and subsequent points in time. Prior to the updating of the base backup, however, the original blocks in the base backup that correspond to the changed blocks are copied to a decremental backup, thus enabling restoration of the source storage 108 at the initial point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the methods disclosed herein are not limited to pruning base and incremental backups, but may also include pruning base and decremental backups.

Figure 3A:
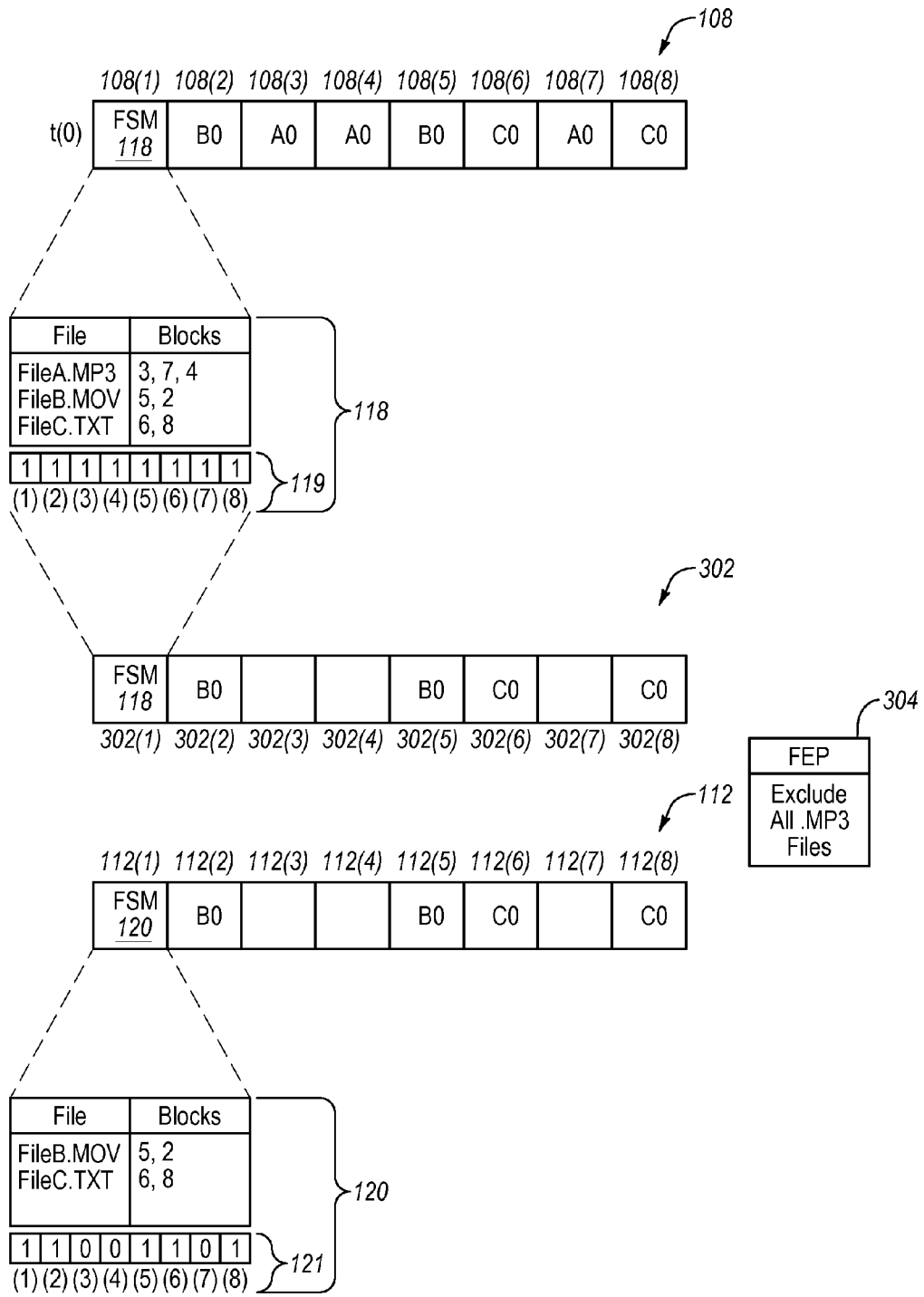
FIGS. 3A-3C are schematic flowcharts illustrating pruning of unwanted file content during the creation and restoration or mounting of a base backup, an incremental backup, and a synthetic backup of a source storage.
Figure 3B:
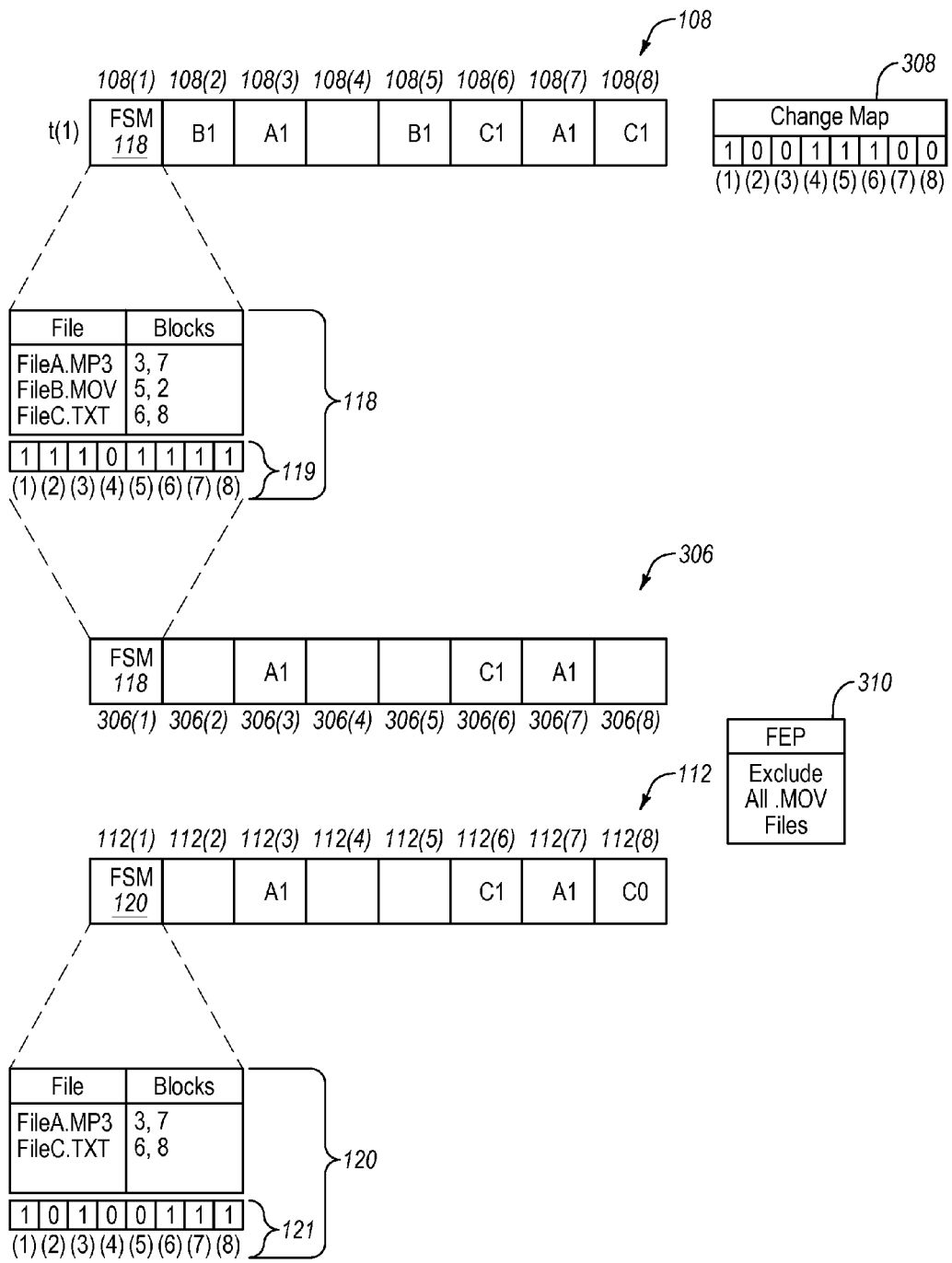
Figure 3C:
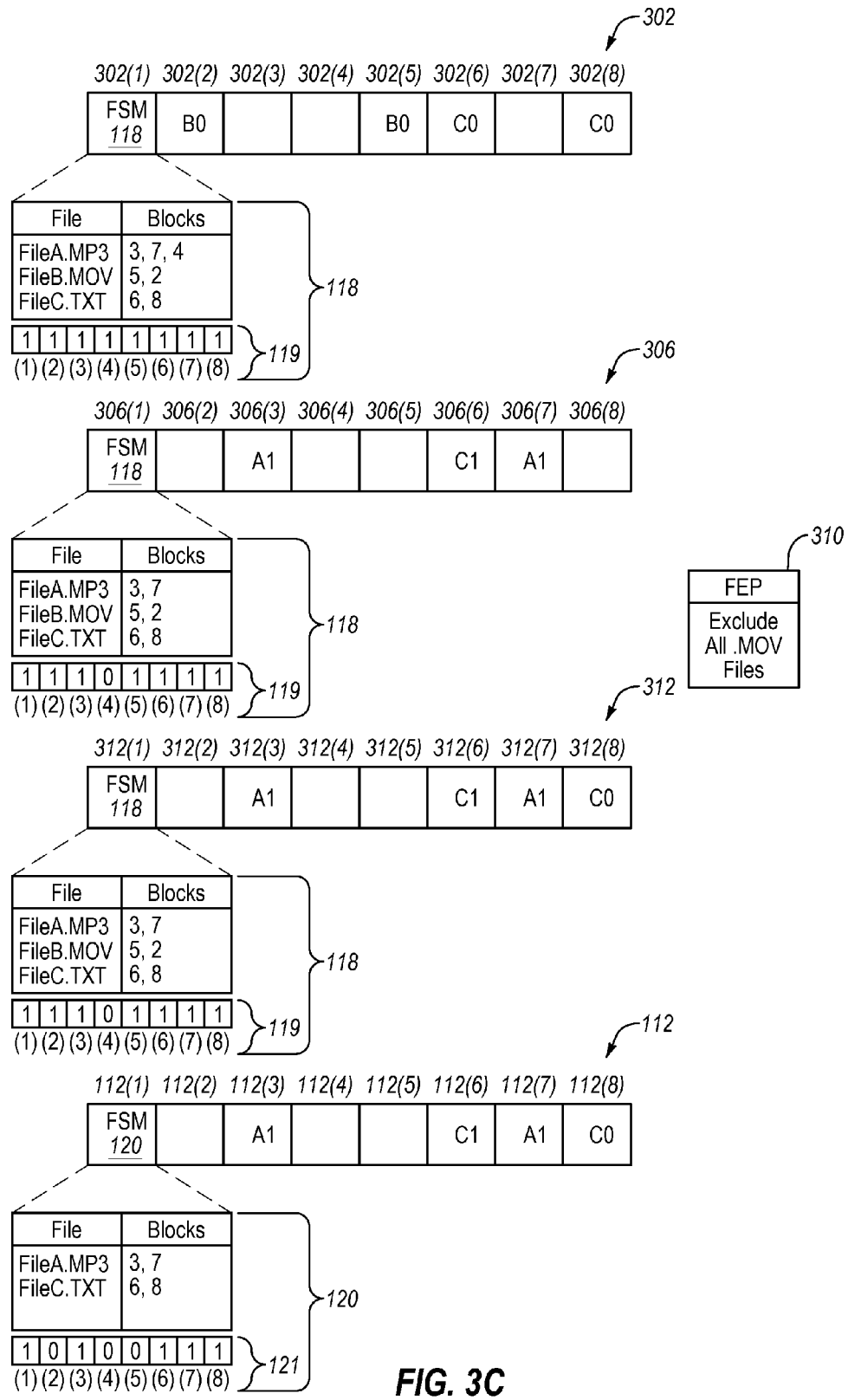

FIGS. 3A-3C are schematic flowcharts illustrating pruning of unwanted file content during the creation and restoration or mounting of a base backup, an incremental backup, and a synthetic backup of the source storage 108. As disclosed in FIGS. 3A-3C, the source storage 108 includes eight blocks having block positions 108(1)-108(8). In some example embodiments, the size of each block in the source storage 108 is 4096 bytes, although any other block size could instead be employed. The size of each block may be configured to match the standard cluster size of a file system of the source storage 108 or the standard sector size of the source storage 108. The block positions in FIGS. 3A-3C having a label therein represent blocks that are allocated at the time indicated. The blank blocks in the storage 108 or 112 of FIGS. 3A-3C represent blocks in the storage 108 or 112 that are free at the time indicated. The blank blocks in the backup 302, 306, or 312 of FIGS. 3A-3C may or may not actually exist in the backup 302, 306, or 312, but are generally illustrated to indicate that no corresponding blocks from the source storage 108 has been included in the backup 302, 306, or 312. The labels in the block positions of FIGS. 3A-3C include a letter to identify the block as corresponding to content of a particular file and a number to identify the state of the block at a particular point in time. For example, the block labeled A0 in FIG. 3A identifies the block as corresponding to content of a file named FileA.MP3 and also identifies the state of the block at time t(0). Similarly, the block labeled C1 in FIG. 3B identifies the block as corresponding to content of a file named FileC.TXT and also identifies the state of the block at time t(1).

FIG. 3A illustrates the source storage 108 at time t(0), a base backup 302 representing the state of the source storage at time t(0) but with unwanted file content having been excluded, and the restore storage 112 after the base backup 302 has been restored to the restore storage 112. FIG. 3A also illustrates the FSM 118 of the source storage at time t(0), which is also backed up in the base backup 302, an FEP 304 that is employed during the creation and restoration or mounting of the base backup 302 to prune unwanted file content, and the FSM 120 of the restore storage after having been restored to the state of the source storage 108 at time t(0) but with unwanted file content having been excluded.

In particular, the FSM 118 at time t(0), which is stored in the source storage 108 at position 108(1), indicates that the source storage 108 includes three files named FileA.MP3, FileB.MOV, and FileC.TXT. FileA.MP3 includes content blocks at positions 108(3), 108(7), and 108(4), FileB.MOV includes content blocks at positions 108(5) and 108(2), and FileC.TXT includes content blocks at positions 108(6) and 108(8). The FSM 118 also include an FSBAM 119 which indicates which positions of the source storage 108 at time t(0) include allocated blocks, with allocated blocks indicated by a 1 and free blocks indicated by a 0.

During the creation of the base backup 302, the FEP 304 directs the exclusion of the contents of all .MP3 files, and may be employed to identify FileA.MP3 as a file to be excluded from the base backup 302. This exclusion can be accomplished by excluding the blocks at positions 108(3), 108(7), and 108(4) of the source storage 108 from the base backup 302 because these blocks correspond to content of FileA.MP3. However, as illustrated in FIG. 3A, the copy of the FSM 118 that is stored as part of the base backup 302, continues to list FileA.MP3, and the FSBAM 119 of the FSM 118 continues to indicate that the content blocks of FileA.MP3 at positions 108(3), 108(7), and 108(4) are allocated. This continued listing of FileA.MP3 in the FSM 118 of the base backup 302 despite the content blocks of FileA.MP3 having been excluded from the base backup 302 may ensure data integrity within a chain of any subsequent incremental backups that depend on the base backup 302, such as the incremental backup 306 of FIG. 3B.

During the restoration of the base backup 302 to the restore storage 112, the FEP 304, which directs the exclusion of all .MP3 files, may be employed to prune the FSM 120 to remove FileA.MP3, which includes updating the FSBAM 121 to indicate that positions 112(3), 112(7), and 112(4) are free, prior to exposing the file system of the restore storage 112 to any user. In this manner, the restore storage 112 may be restored to the state of the source storage at time t(0) but with unwanted file content of FileA.MP3 having been excluded and the FSM 120 entry for FileA.MP3 having been removed. This pruning of unwanted file content of FileA.MP3 may decrease the overall size requirements of the destination storage 110 where the base backup 302 is stored, decrease the bandwidth overhead of transporting the base backup 302 over the network 116, decrease the processing time associated with collapsing the base backup 302 into a synthetic backup, and/or decrease the processing time associated with restoring the base backup 302 on the restore storage 112.

FIG. 3B illustrates the source storage 108 at time t(1), the incremental backup 306 of the state of the source storage 108 at time t(1) but with unwanted file content having been excluded, and the restore storage 112 after the incremental backup 306 has been restored to the restore storage 112. FIG. 3B also illustrates the FSM 118, including the FSBAM 119, of the source storage at time t(1), which is also backed up in the incremental backup 306, a change map 308 in which all blocks changed between time t(0) and time t(1) are tracked, with changed blocks indicated by a 1 and unchanged blocks indicated by a 0, an FEP 310 that is employed during the creation and restoration or mounting of the incremental backup 306 to prune unwanted file content, and the FSM 120 of the restore storage 112 after having been restored to the state of the source storage 108 at time t(1) but with unwanted file content having been excluded.

The FSM 118 at time t(1), which is stored in the source storage 108 at position 108(1), continues to indicate that the source storage 108 includes three files named FileA.MP3, FileB.MOV, and FileC.TXT. However, the change map 308, which may be stored in a memory of the source system 102 for example, indicates that the blocks at positions 108(1), 108(4), 108(5), and 108(6) changed between time t(0) and time t(1). It is also clear from the FSBAM 119 and the FSM 118 that the block at position 108(4) was modified between time t(0) and time t(1) but then later deleted from FileA.MP3 between time t(0) and time t(1). It is noted that the deletion of the block at position 108(4) may not actually involve deleting the content of the block at position 108(4), but may instead only involve altering the FSBAM 119 and the FSM 118, leaving the content of the block at position 108(4) unreferenced and thereby effectively "deleted."

During the creation of the incremental backup 306, initially all allocated blocks indicated as changed in the change map 308 are targeted for inclusion in the incremental backup. Therefore, the blocks at positions 108(1), 108(5), and 108(6) are initially targeted from inclusion. It is noted that although the block at position 108(4) is also indicated as changed in the change map 308, since position 108(4) is indicated as free in the FSBAM 119 in FIG. 3B, the block at position 108(4) is not an allocated block, and therefore is not a changed allocated block. However, the FEP 310 directs the exclusion of all .MOV files, and may be employed to identify FileB.MOV as a file to be excluded from the incremental backup 306. This exclusion can be accomplished by excluding the changed allocated block at position 108(5) of the source storage 108 from the incremental backup 306 because this block corresponds to content of FileB.MOV. However, as illustrated in FIG. 3B, the copy of the FSM 118 that is stored in the incremental backup 306 continues to list FileB.MOV, and the FSBAM 119 of the FSM 118 continues to indicate that the content blocks of FileB.MOV at positions 108(5) and 108(2) are allocated. This continued listing of FileB.MOV in the FSM 118 of the incremental backup 306 despite the content blocks of FileB.MOV having been excluded from the incremental backup 306 may ensure data integrity within a chain of any subsequent incremental backups that depend on the incremental backup 306.

In addition to excluding unwanted files, the creation of the incremental backup 306 may also include identifying files that were previously excluded from the base backup 302 but that now should be included in the incremental backup 306 due to a change in the file exclusion policy, and then including allocated blocks that correspond to content of the files to be included in the incremental backup 306. For example, while .MP3 files were previously excluded according to the initial FEP 304, the current FEP 310 does not exclude .MP3 files. Therefore, while FileA.MP3 was previously excluded from the base backup 302, FileA.MP3 may now be identified to be included and then the blocks at positions 108(3) and 108(7) that correspond to content of FileA.MP3 may be included in the incremental backup 306.

During the restoration of the incremental backup 306 to the restore storage 112, the FEP 310 directs the exclusion of all .MOV files and may be employed to prune the FSM 120 to remove FileB.MOV, which includes updating the FSBAM 121 to indicate that positions 112(5) and 112(2) are free, prior to exposing the file system of the restore storage 112 to any user. In this manner, the restore storage 112 may be restored to the state of the source storage at time t(1) but with unwanted file content of FileB.MOV having been excluded. This pruning of unwanted file content of FileB.MOV may decrease the overall size requirements of the destination storage 110 where the incremental backup 306 is stored, decrease the bandwidth overhead of transporting the incremental backup 306 over the network 116, decrease the processing time associated with collapsing the incremental backup 306 into a synthetic backup, and/or decrease the processing time associated with restoring the incremental backup 306 on the restore storage 112.

FIG. 3C illustrates the base backup 302, along with its associated FSM 118 and FSBAM 119. FIG. 3C also illustrates the incremental backup 306, along with its associated FSM 118 and FSBAM 119. FIG. 3C also illustrates a synthetic base backup 312, along with its associated FSM 118 and FSBAM 119, which is a collapse of the base backup 302 and the incremental backup 306 but with unwanted file content having been excluded. FIG. 3C also illustrates the FEP 310 that is identical for both the incremental backup 306 and the synthetic base backup 312. FIG. 3C also illustrates the restore storage 112 after the synthetic base backup 312 has been restored to the restore storage 112.

During the creation of the synthetic base backup 312, a set of allocated blocks may be identified that includes a most recent allocated block for each unique block position indicated as allocated within the FSBAM 119 of the incremental backup 306. For example, the blocks in positions 108(1), 108(3), 108(6), 108(7) will come from the incremental backup 306, the blocks in positions 108(2), 108(5), and 108(4) will come from the base backup 302, and the block in position 108(4) will not be included since it is not indicated as being allocated in the FSBAM included with the incremental backup 306. Then, the FEP 310, which directs the exclusion of all .MOV files, may be employed to identify FileB.MOV as a file to be excluded from the synthetic base backup 312. This exclusion can be accomplished by pruning the set of blocks to exclude the blocks at positions 108(5) and 108(2) because these blocks correspond to content of FileB.MOV. This pruned set of blocks can then be included in the synthetic base backup 312. However, as illustrated in FIG. 3C, the copy of the FSM 118 that is stored in the synthetic base backup 312 continues to list FileB.MOV, and the FSBAM 119 of the FSM 118 continues to indicate that the content blocks of FileB.MOV at positions 108(5) and 108(2) are allocated. This continued listing of FileB.MOV in the FSM 118 of the synthetic base backup 312, despite the content blocks of FileB.MOV having been excluded from the synthetic base backup 312, may ensure data integrity within a chain of any subsequent incremental backups that depend on the synthetic base backup 312.

During the restoration of the synthetic base backup 312 to the restore storage 112, the FEP 310, which directs the exclusion of all .MOV files, may be employed to prune the FSM 120 to remove FileB.MOV, which includes updating the FSBAM 121 to indicate that positions 112(5) and 112(2) are free, prior to exposing the file system of the restore storage 112 to any user. In this manner, the restore storage 112 may be restored to the state of the source storage at time t(1) but with unwanted file content of FileB.MOV having been excluded. This pruning of unwanted file content of FileB.MOV may decrease the overall size requirements of the destination storage 110 where the synthetic base backup 312 is stored, decrease the bandwidth overhead of transporting the synthetic base backup 312 over the network 116, decrease the processing time associated with collapsing the synthetic base backup 312 into another synthetic backup, and/or decrease the processing time associated with restoring the synthetic base backup 312 on the restore storage 112.

Although FIGS. 3A-3C illustrate the restoration of various backups to the restore storage 112, it is understood that the restore storage 112 could be replaced with a virtual volume of a virtual machine, or of another virtual device such as a virtual disk, and these various backups could be mounted on the virtual volume in a similar manner. In particular, the mounting may include pruning FSM of a file system of the virtual volume to modify metadata associated with the files to be excluded prior to exposing the file system to any user. Therefore, the example methods disclosed herein apply equally to restoration of a backup to a physical volume or to mounting the backup as a virtual volume.

It is understood also that the scale of the source storage 108 including only eight blocks, and the files on the source storage including only two or three blocks in FIGS. 3A-3C is for example purposes only, and in practice the source storage 108 may include at least billions of blocks, and each file may also include at least billions of blocks. For example, a single digital movie file (a .MOV file) may include billions of blocks, and the exclusion of such a digital movie file from a backup will result in the backup being billions of blocks smaller in size.

FIGS. 4, 5A-5B, and 6A-6B are schematic flowchart diagrams of example methods 400, 500, and 600 of pruning unwanted file content from a base image backup, an incremental image backup, and a synthetic image backup, respectively. The methods 400, 500, and 600 may be implemented, in at least some embodiments, by the backup module 114 of the source system 102 of FIG. 1. For example, the backup module 114 may be configured to execute computer instructions to perform operations of pruning unwanted file content from backups of the source storage 108, as represented by one or more steps of the methods 400, 500, and 600. Although illustrated as discrete steps, various steps may be divided into additional steps, combined into fewer steps, or eliminated, depending on the desired implementation. The methods 400, 500, and 600 will now be discussed with reference to FIGS. 1-6B.

Figure 4:
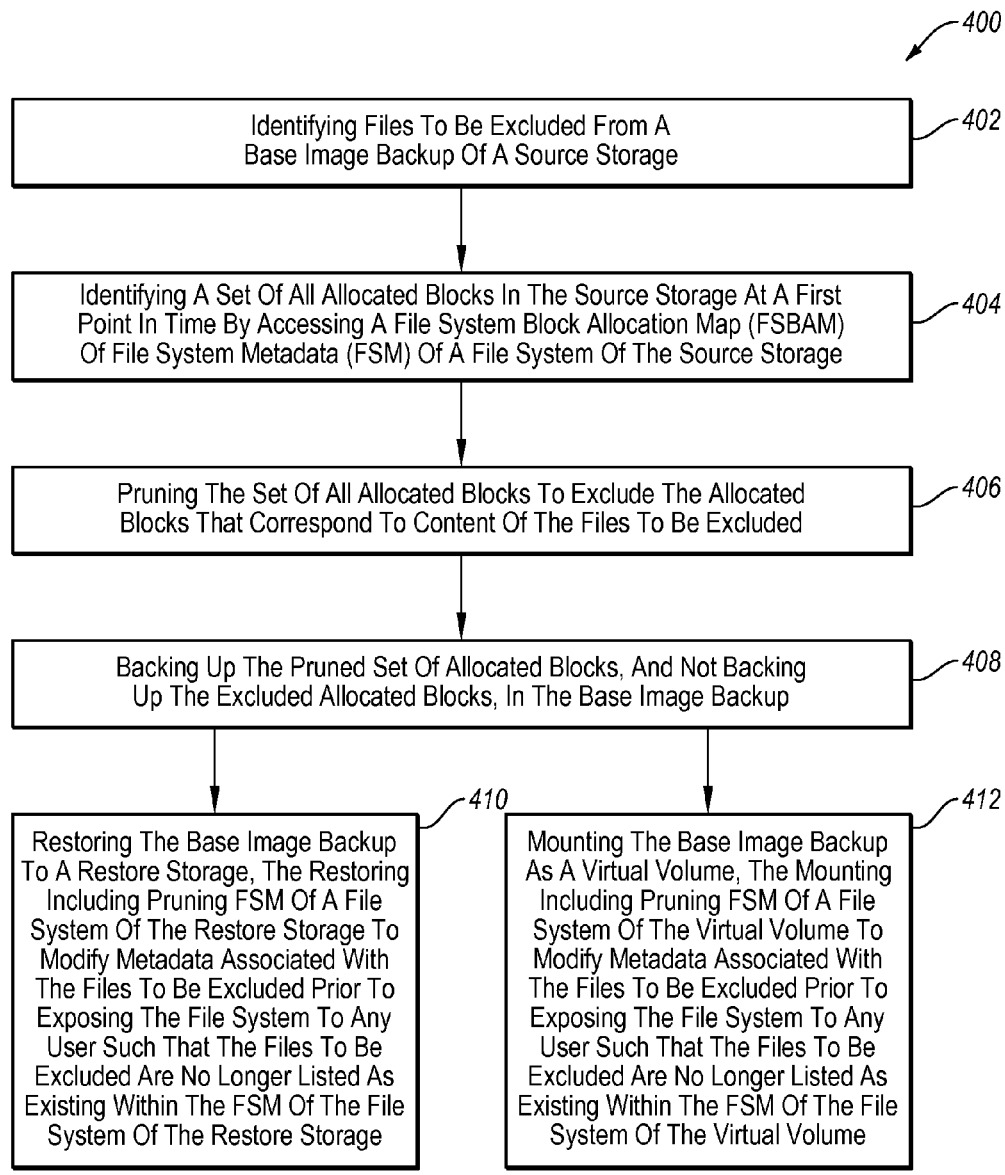
FIG. 4 is a schematic flowchart diagram of an example method of pruning unwanted file content from a base image backup.

The method 400 of FIG. 4 may include a step 402 of identifying files to be excluded from a base image backup of a source storage. For example, the backup module 114 may identify, at step 402, FileA.MP3 of FIG. 3A as a file to be excluded from the base backup 302 of the source storage 108.

This identification at step 402 may be accomplished in a variety of ways. For example, the step 402 may be accomplished by identifying all files on the source storage 108 at time t(0) that correspond to the FEP 304 and associating the FEP 304 with the base backup 302. Additionally or alternatively, the step 402 may be accomplished by identifying all files on the source storage 108 at time t(0) that do not correspond to a file inclusion policy and associating the file inclusion policy with the base backup 302. Additionally or alternatively, the step 402 may be accomplished by identifying a user-specified list of excluded files and associating the user-specified list of excluded files with the base backup 302. Additionally or alternatively, the step 402 may be accomplished by identifying all files on the source storage 108 at the time t(0) that do not correspond to a user-specified list of included files and associating the user-specified list of included files with the base backup 302. It is understood any of a file exclusion policy, a file inclusion policy, a user-specified list of excluded files, and a user-specified list of included files may be formulated in a variety of different ways including specifying one or more specific files, one or more file types, one or more file characteristics such as file size or file last modified date, or any other formulation that clearly identifies some subset of files to be included or excluded. Therefore, the identification of files to exclude at step 402 is not limited to the example method of identification employed in the example embodiments of FIGS. 3A-3C.

The method 400 may also include a step 404 of identifying a set of all allocated blocks in the source storage at a first point in time by accessing a file system block allocation map (FS- BAM) of file system metadata (FSM) of a file system of the source storage. Continuing with the above example, the backup module 114 may, at step 404, identify a set of all allocated blocks in the source storage 108 at time t(0) by accessing the FSBAM 119 of the FSM 118 of a file system of the source storage 108, as disclosed in FIG. 3A. As noted above, the FSBAM 119 indicates, as being allocated, block positions that are allocated in the source storage 108. As disclosed in FIG. 3A, the FSBAM 119 indicates that the blocks at positions 108(1)-108(8) are allocated.

The method 400 may also include a step 406 of pruning the set of all allocated blocks to exclude the allocated blocks that correspond to content of the files to be excluded. Continuing with the above example, the backup module 114 may, at step 406, prune the set of all allocated blocks, which initially included blocks at positions 108(1)-108(8), to exclude the allocated blocks at positions 108(3), 108(7), and 108(4) that correspond to the content of FileA.MP3.

The method 400 may also include a step 408 of backing up the pruned set of allocated blocks, and not backing up the excluded allocated blocks, in the base image backup. Continuing with the above example, the backup module 114 may, at step 408, back up the pruned set of allocated blocks, which includes the allocated blocks at positions 108(1), 108(2), 108(5), 108(6), and 108(8), and not backing up the excluded allocated blocks, which include the allocated blocks at positions 108(3), 108(4), and 108(7), in the base backup 302, as disclosed in FIG. 3A.

The method 400 may also include a step 410 of restoring the base image backup to a restore storage, with the restoring including pruning FSM of a file system of the restore storage to modify metadata associated with the files to be excluded prior to exposing the file system to any user such that the files to be excluded are no longer listed as existing within the FSM of the file system of the restore storage. Continuing with the above example, the backup module 114 may, at step 410, restore the base backup 302 to the restore storage 112. This restoring may include pruning the FSM 120 of a file system of the restore storage 112 to modify metadata associated with FileA.MP3 prior to exposing the file system to any user such that FileA.MP3 is no longer listed as existing within the FSM 120 of the file system of the restore storage 112, as disclosed in FIG. 3A.

As an alternative to the step 410, the method 400 may instead include a step 412 of mounting the base image backup as a virtual volume, the mounting including pruning FSM of a file system of the virtual volume to modify metadata associated with the files to be excluded prior to exposing the file system to any user such that the files to be excluded are no longer listed as existing within the FSM of the file system of the virtual volume. Continuing with the above example, the backup module 114 may, at step 412, mount the base backup 302 as a virtual volume. This mounting may include pruning the FSM of a file system of the virtual volume to modify metadata associated with FileA.MP3 prior to exposing the file system to any user such that FileA.MP3 is no longer listed as existing within the FSM of the file system of the virtual volume.

Figure 5A:
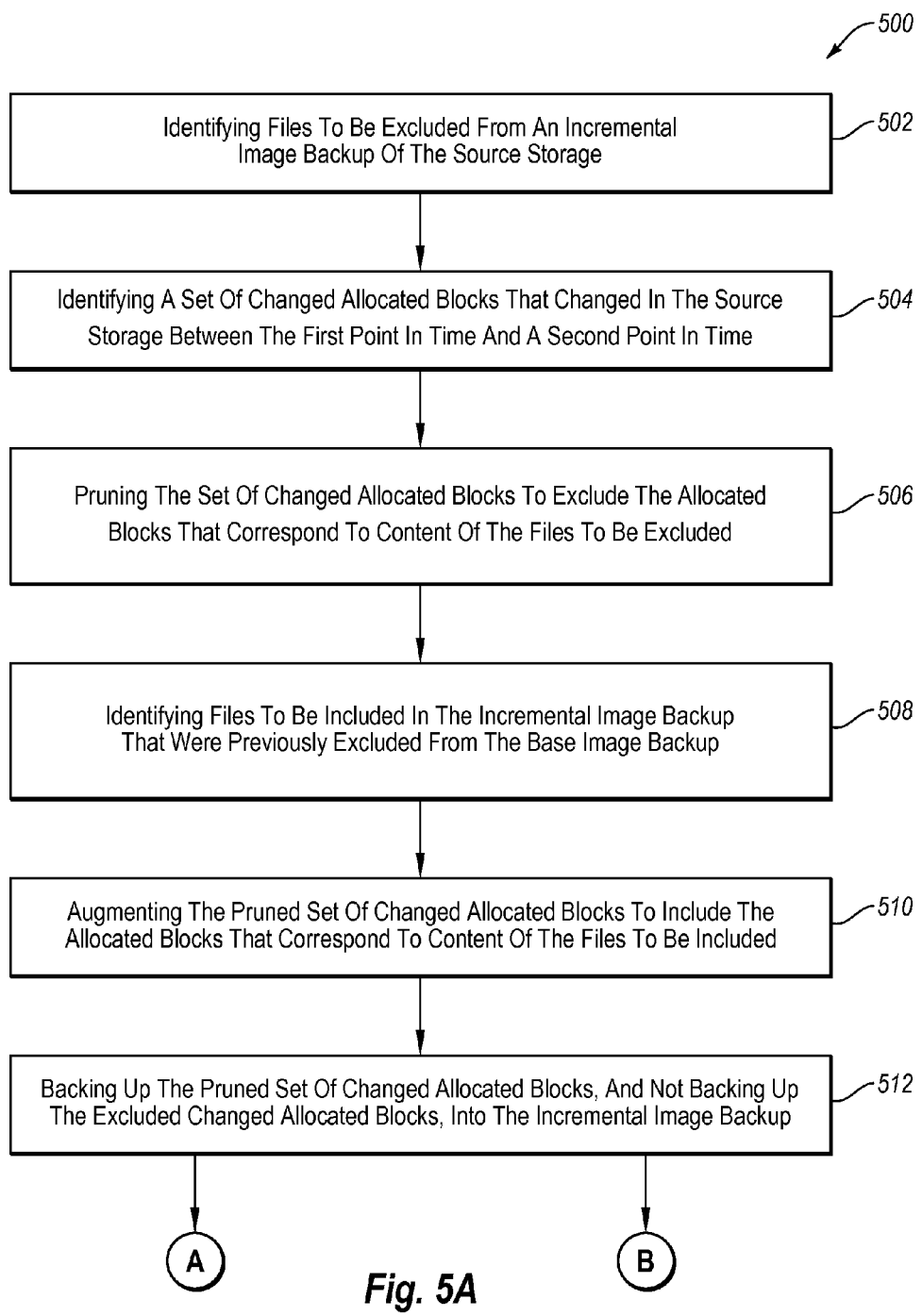
FIGS. 5A-5B are a schematic flowchart diagram of an example method of pruning unwanted file content from an incremental image backup.
Figure 5B:
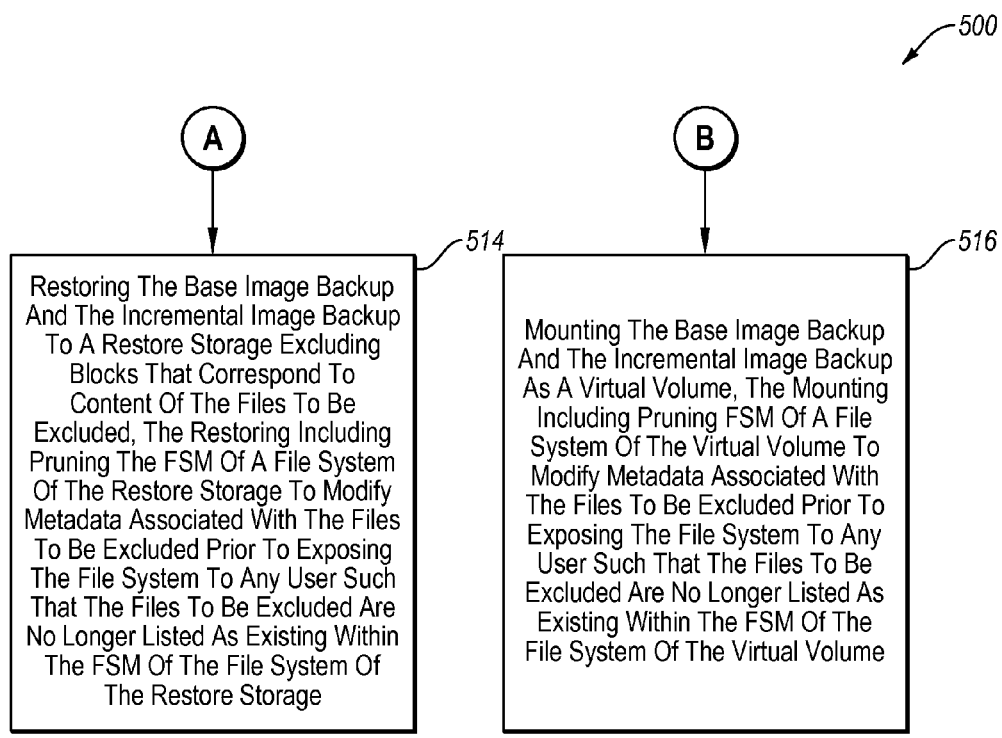

The method 500 of FIGS. 5A-5B may begin at step 502 of identifying files to be excluded from an incremental image backup of a source storage. Continuing with the above example, the backup module 114 may identify, at step 502, FileB.MOV of FIG. 3B as a file to be excluded from the incremental backup 306 of the source storage 108. This identification at step 502 may be accomplished in a variety of ways, including any of the ways discussed above in connection with the step 502, but using the FEP 310 of FIG. 3B instead of the FEP 304 of FIG. 3A.

The method 500 may also include a step 504 of identifying a set of changed allocated blocks that changed in the source storage between the first point in time and a second point in time. Continuing with the above example, the backup module 114 may, at step 504, identify a set of changed allocated blocks, such as the changed allocated blocks at positions 108(1), 108(5), and 108(6) as indicated in the change map 308, that changed in the source storage 108 between time t(0) and time t(1). It is noted that although the block at position 108(4) is also indicated as changed in the change map 308, since position 108(4) is indicated as free in the FSBAM 119 in FIG. 3B, the block at position 108(4) is not a allocated block, and therefore does not belong in the set of changed allocated blocks.

The method 500 may also include a step 506 of pruning the set of changed allocated blocks to exclude the allocated blocks that correspond to content of the files to be excluded. Continuing with the above example, the backup module 114 may, at step 506, prune the set of changed allocated blocks, which initially included blocks at positions 108(5) and 108(6), to exclude the allocated block at position 108(5) that corresponds to the content of FileB.MOV.

The method 500 may also include a step 508 of identifying files to be included in the incremental image backup that were previously excluded from the base image backup. Continuing with the above example, the backup module 114 may, at step 508, identify that FileA.MP3 should be included in the incremental backup 306 because while .MP3 files were previously excluded according to the initial FEP 304, the current FEP 310 does not exclude .MP3 files.

The method 500 may also include a step 510 of augmenting the pruned set of changed allocated blocks to include the allocated blocks that correspond to content of the files to be included. Continuing with the above example, the backup module 114 may, at step 510, augment the pruned set of changed allocated blocks, which after pruning only includes the block at position 108(6), to include the allocated blocks at positions 108(3) and 108(7) that correspond to content of FileA.MP3.

The method 500 may also include a step 512 of backing up the pruned set of changed allocated blocks, and not backing up the excluded changed allocated blocks, in the incremental image backup. Continuing with the above example, the backup module 114 may, at step 512, back up the pruned set of changed allocated blocks, which includes the allocated blocks at positions 108(1), 108(3), 108(6), and 108(7), and not backing up the excluded changed allocated blocks, which include the allocated block at position 108(5), in the incremental backup 306, as disclosed in FIG. 3B.

The method 500 may also include a step 514 of restoring the base image backup and the incremental image backup to a restore storage, with the restoring including pruning FSM of a file system of the restore storage to modify metadata associated with the files to be excluded prior to exposing the file system to any user such that the files to be excluded are no longer listed as existing within the FSM of the file system of the restore storage. Continuing with the above example, the backup module 114 may, at step 514, restore the base backup 302 and the incremental backup 306 to the restore storage 112. This restoring may include applying the backup files to the restore storage 112 from oldest to newest, namely, first applying the base backup 302 and then applying the incremental backup 306. This restoring may also include pruning the FSM 120 of a file system of the restore storage 112 to modify metadata associated with FileB.MOV prior to exposing the file system to any user such that FileB.MOV is no longer listed as existing within the FSM 120 of the file system of the restore storage 112, as disclosed in FIG. 3B.

As an alternative to the step 514, the method 500 may instead include a step 516 of mounting the base image backup and the incremental image backup as a virtual volume, the mounting including pruning FSM of a file system of the virtual volume to modify metadata associated with the files to be excluded prior to exposing the file system to any user such that the files to be excluded are no longer listed as existing within the FSM of the file system of the virtual volume. Continuing with the above example, the backup module 114 may, at step 516, mount the base backup 302 and the incremental backup 306 as a virtual volume. This mounting may include pruning the FSM of a file system of the virtual volume to modify metadata associated with FileB.MOV prior to exposing the file system to any user such that FileA.MOV is no longer listed as existing within the FSM of the file system of the virtual volume.

Figure 6A:
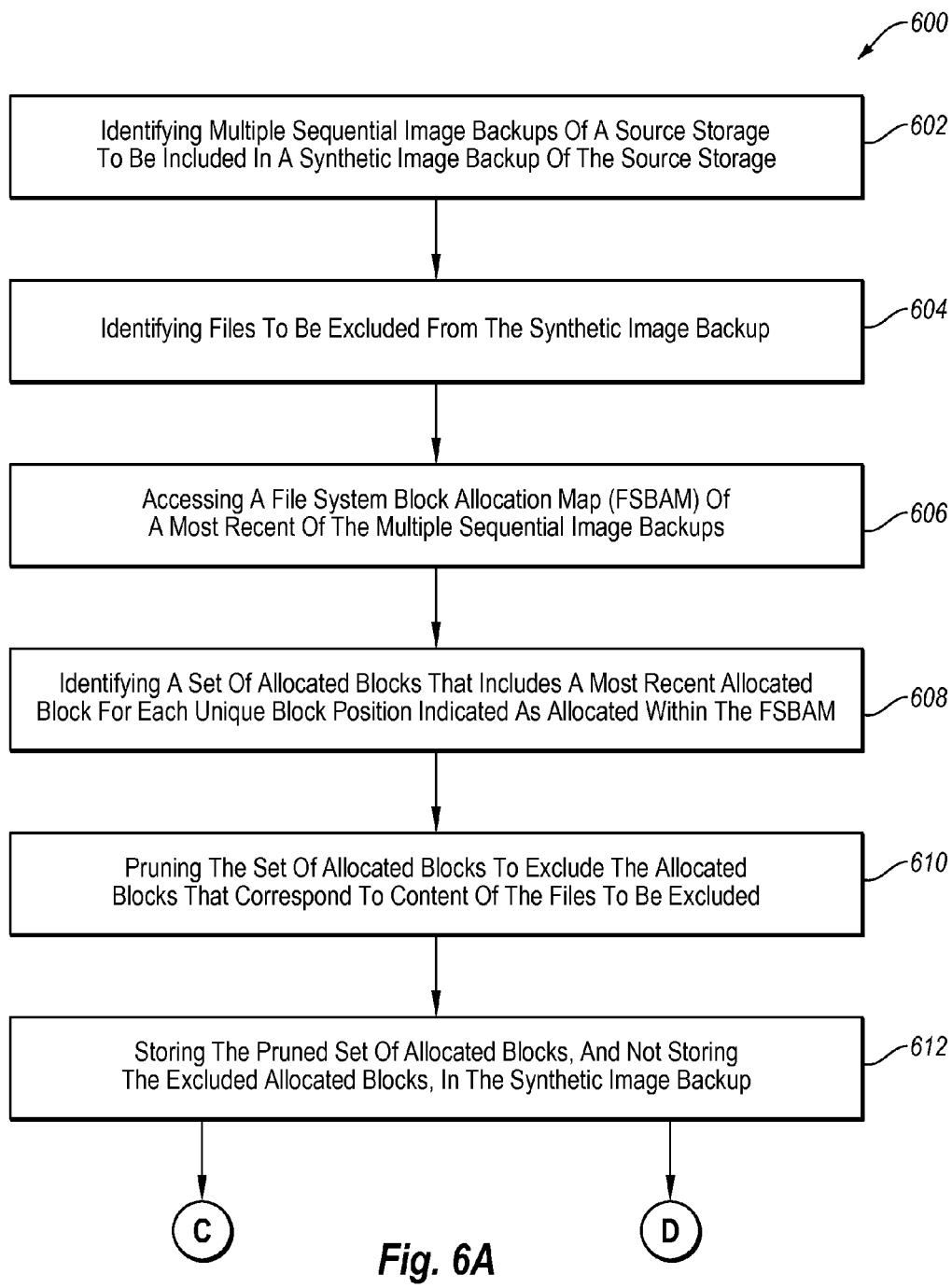
FIGS. 6A-6B are a schematic flowchart diagram of an example method of pruning unwanted file content from a synthetic image backup.
Figure 6B:
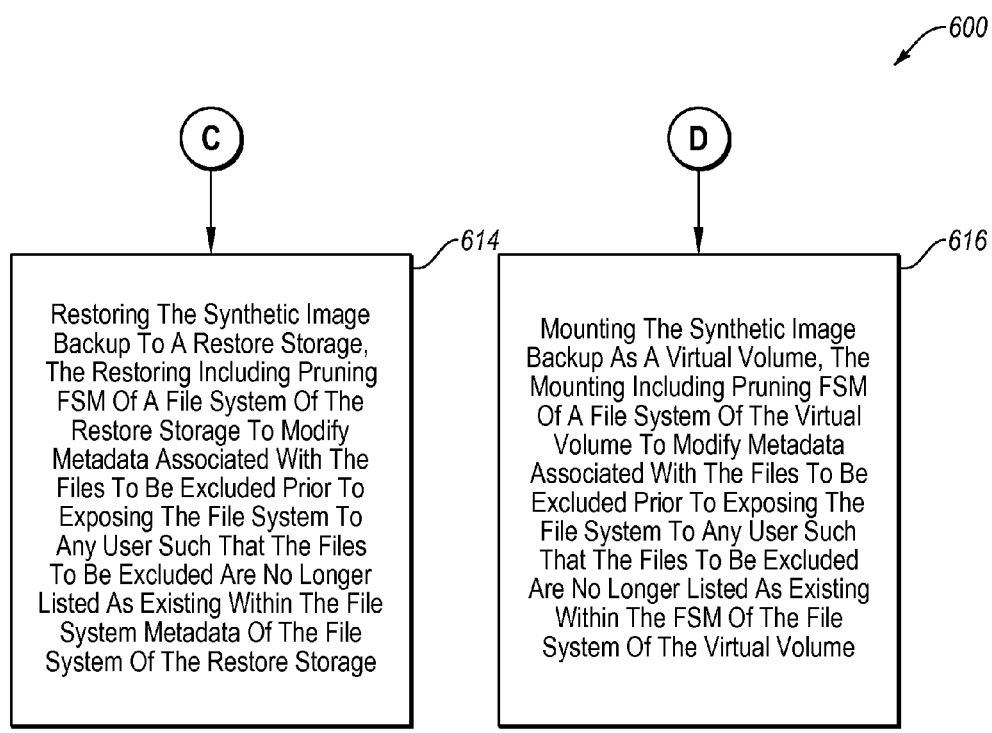

The method 600 of FIGS. 6A-6B may include a step 602 of identifying multiple sequential image backups of a source storage to be included in a synthetic image backup of the source storage. Continuing with the above example, the backup module 114 may, at step 602, identify the base backup 302 and the incremental backup 306 to be included in the synthetic base backup 312 of the source storage 108, as disclosed in FIG. 3C.

The method 600 may include a step 604 of identifying files to be excluded from the synthetic image backup. Continuing with the above example, the backup module 114 may identify, at step 604, FileB.MOV as a file to be excluded from the synthetic base backup 312. This identification at step 604 may be accomplished in a variety of ways, including any of the ways discussed above in connection with the step 602, but using the FEP 310 of FIG. 3C instead of the FEP 304 of FIG. 3A.

The method 600 may also include a step 606 of accessing a file system block allocation map (FSBAM) of a most recent of the multiple sequential image backups. Continuing with the above example, the backup module 114 may, at step 606, access the FSBAM 119 of the FSM 118 that is associated with the incremental backup 306.

The method 600 may also include a step 608 of identifying a set of allocated blocks that includes a most recent allocated block for each unique block position indicated as allocated within the FSBAM. Continuing with the above example, the backup module 114 may, at step 608, identify a set of allocated blocks that includes a most recent allocated block for each unique block position indicated as allocated within the FSBAM 119. For example, the most recent blocks for each of the positions that are indicated as allocated within the FSBAM 119 are blocks in positions 108(1), 108(3), 108(6), and 108(7) from the incremental backup 306 and blocks in positions 108(2), 108(5), and 108(8) from the base backup 302. It is noted that the block in position 108(4) in not included in the set of allocated blocks because this position is not indicated as being allocated in the FSBAM 119 that is included with the incremental backup 306.

The method 600 may also include a step 610 of pruning the set of allocated blocks to exclude the allocated blocks that correspond to content of the files to be excluded. Continuing with the above example, the backup module 114 may, at step 610, prune the set of allocated blocks, which initially included blocks at positions 108(1)-108(3) and 108(5)-108(8), to exclude the allocated blocks at positions 108(2) and 108(5) that correspond to the content of FileB.MOV.

The method 600 may also include a step 612 of storing the pruned set of allocated blocks, and not storing the excluded allocated blocks, in the synthetic image backup. Continuing with the above example, the backup module 114 may, at step 612, store the pruned set of allocated blocks, which includes the allocated blocks at positions 108(1), 108(3), and 108(6)-108(8), and not backing up the excluded allocated blocks, which include the allocated blocks at positions 108(2) and 108(5), in the synthetic base backup 312, as disclosed in FIG. 3C.

The method 600 may also include a step 614 of restoring the synthetic image backup to a restore storage, with the restoring including pruning FSM of a file system of the restore storage to modify metadata associated with the files to be excluded prior to exposing the file system to any user such that the files to be excluded are no longer listed as existing within the FSM of the file system of the restore storage. Continuing with the above example, the backup module 114 may, at step 614, restore the synthetic base backup 312 to the restore storage 112. This restoring may include pruning the FSM 120 of a file system of the restore storage 112 to modify metadata associated with FileB.MOV prior to exposing the file system to any user such that FileB.MOV is no longer listed as existing within the FSM 120 of the file system of the restore storage 112, as disclosed in FIG. 3C.

As an alternative to the step 614, the method 600 may instead include a step 616 of mounting the synthetic image backup as a virtual volume, the mounting including pruning FSM of a file system of the virtual volume to modify metadata associated with the files to be excluded prior to exposing the file system to any user such that the files to be excluded are no longer listed as existing within the FSM of the file system of the virtual volume. Continuing with the above example, the backup module 114 may, at step 616, mount the synthetic base backup 312 as a virtual volume. This mounting may include pruning the FSM of a file system of the virtual volume to modify metadata associated with FileB.MOV prior to exposing the file system to any user such that FileA.MOV is no longer listed as existing within the FSM of the file system of the virtual volume.

Although the identification of a set of blocks in the methods 400, 500, and 600 is generally discussed herein as preceding the pruning of the set of blocks, it is understood that the pruning could occur prior to or simultaneously with the identification of the set of blocks. Therefore, it is not necessary that a block be included in the set of blocks prior to being pruned from the set of blocks, and the pruning disclosed herein can instead prevent a block from ever being included in the set of blocks. In addition, although the accessing of the FSBAM at step 606 precedes the identification of the set of blocks at step 608 and the pruning at step 610, the accessing could occur simultaneously with the identification and/or the pruning.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of pruning unwanted file content from an image backup, the method comprising:
    identifying files to be excluded from a base image backup of a source storage;
    identifying a set of allocated blocks in the source storage at a first point in time by accessing a file system block allocation map (FSBAM) of file system metadata (FSM) of a file system of the source storage, the FSBAM indicating, as being allocated, block positions that are allocated in the source storage;
    pruning the set of allocated blocks to exclude the allocated blocks that correspond to content of the files to be excluded;
    backing up the pruned set of allocated blocks, and not backing up the excluded allocated blocks, in the base image backup; and
    restoring the base image backup to a restore storage, the restoring including pruning FSM of a file system of the restore storage to modify metadata associated with the files to be excluded prior to exposing the file system to any user such that the files to be excluded are no longer listed as existing within the FSM of the file system of the restore storage.

2. The method as recited in claim 1, wherein the identifying the files to be excluded includes:
    identifying all files on the source storage at the first point in time that correspond to a file exclusion policy; and
    associating the file exclusion policy with the base image backup.

3. The method as recited in claim 1, wherein the identifying the files to be excluded includes:
    identifying a user-specified list of excluded files; and
    associating the user-specified list of excluded files with the base image backup.

4. The method as recited in claim 1, wherein the identifying the files to be excluded includes:
    identifying all files on the source storage at the first point in time that do not correspond to a file inclusion policy; and
    associating the file inclusion policy with the base image backup.

5. The method as recited in claim 1, wherein the identifying the files to be excluded includes:
    identifying all files on the source storage at the first point in time that do not correspond to a user-specified list of included files; and
    associating the user-specified list of included files with the base image backup.

6. The method as recited in claim 1, wherein the restore storage is the same storage as the source storage.

7. The method as recited in claim 1, wherein the restore storage is a virtual volume and the restoring the base image backup to the restore storage includes mounting the base image backup as the virtual volume.

8. The method as recited in claim 1, further comprising:
    identifying files to be excluded from an incremental image backup of the source storage;
    identifying a set of changed allocated blocks that changed in the source storage between the first point in time and a second point in time;
    pruning the set of changed allocated blocks to exclude the allocated blocks that correspond to content of the files to be excluded; and
    backing up the pruned set of changed allocated blocks, and not backing up the excluded changed allocated blocks, into the incremental image backup.

9. The method as recited in claim 8, further comprising, prior to the backing up the pruned set of blocks:
    identifying files to be included in the incremental image backup that were previously excluded from the base image backup; and
    augmenting the pruned set of changed allocated blocks to include the allocated blocks that correspond to content of the files to be included.

10. One or more non-transitory computer-readable media storing one or more programs that are configured, when executed, to cause one or more processors to perform the method as recited in claim 1.

11. A method of pruning unwanted file content from an image backup, the method comprising:
    identifying multiple sequential image backups of a source storage to be included in a synthetic image backup of the source storage;
    identifying files to be excluded from the synthetic image backup;
    accessing a file system block allocation map (FSBAM) of a most recent of the multiple sequential image backups, the FSBAM indicating, as being allocated, block positions that were allocated in the source storage at a creation time of the most recent image backup;
    identifying a set of allocated blocks that includes a most recent allocated block for each unique block position indicated as allocated within the FSBAM;
    pruning the set of allocated blocks to exclude the allocated blocks that correspond to content of the files to be excluded; and
    storing the pruned set of allocated blocks, and not storing the excluded allocated blocks, in the synthetic image backup.

12. The method as recited in claim 11, wherein the identifying the files to be excluded includes:

identifying all files contained in the multiple sequential image backups that correspond to a file exclusion policy; and associating the file exclusion policy with the synthetic image backup.

13. The method as recited in claim 11, wherein the identifying the files to be excluded includes:

identifying a user-specified list of excluded files; and associating the user-specified list of excluded files with the synthetic image backup.

14. The method as recited in claim 11, wherein the identifying the files to be excluded includes:

identifying all files contained in the multiple sequential image backups that do not correspond to a file inclusion policy; and associating the file inclusion policy with the synthetic image backup.

15. The method as recited in claim 11, wherein the identifying the files to be excluded includes:

identifying all files contained in the multiple sequential image backups that do not correspond to a user-specified list of included files; and associating the user-specified list of included files with the synthetic image backup.

16. The method as recited in claim 11, further comprising restoring the synthetic image backup to a restore storage, the restoring including pruning FSM of a file system of the restore storage to modify metadata associated with the files to be excluded prior to exposing the file system to any user such that the files to be excluded are no longer listed as existing within the file system metadata of the file system of the restore storage.

17. The method as recited in claim 16, wherein the files to be excluded are determined using a file policy and/or a user-specified list of files associated with the most recent image backup.

18. The method as recited in claim 11, further comprising mounting the synthetic image backup as a virtual volume, the mounting including pruning FSM of a file system of the virtual volume to modify metadata associated with the files to be excluded prior to exposing the file system to any user such that the files to be excluded are no longer listed as existing within the FSM of the file system of the virtual volume.

19. The method as recited in claim 18, wherein the files to be excluded are determined using a file policy and/or a user-specified list of files associated with the most recent image backup.

20. One or more non-transitory computer-readable media storing one or more programs that are configured, when executed, to cause one or more processors to perform the method as recited in claim 11.

* * * * *